Feb. 11, 1964     D. D. STOLTMAN     3,120,874
VEHICLE ROAD SPEED CONTROL SYSTEM
Filed May 4, 1962
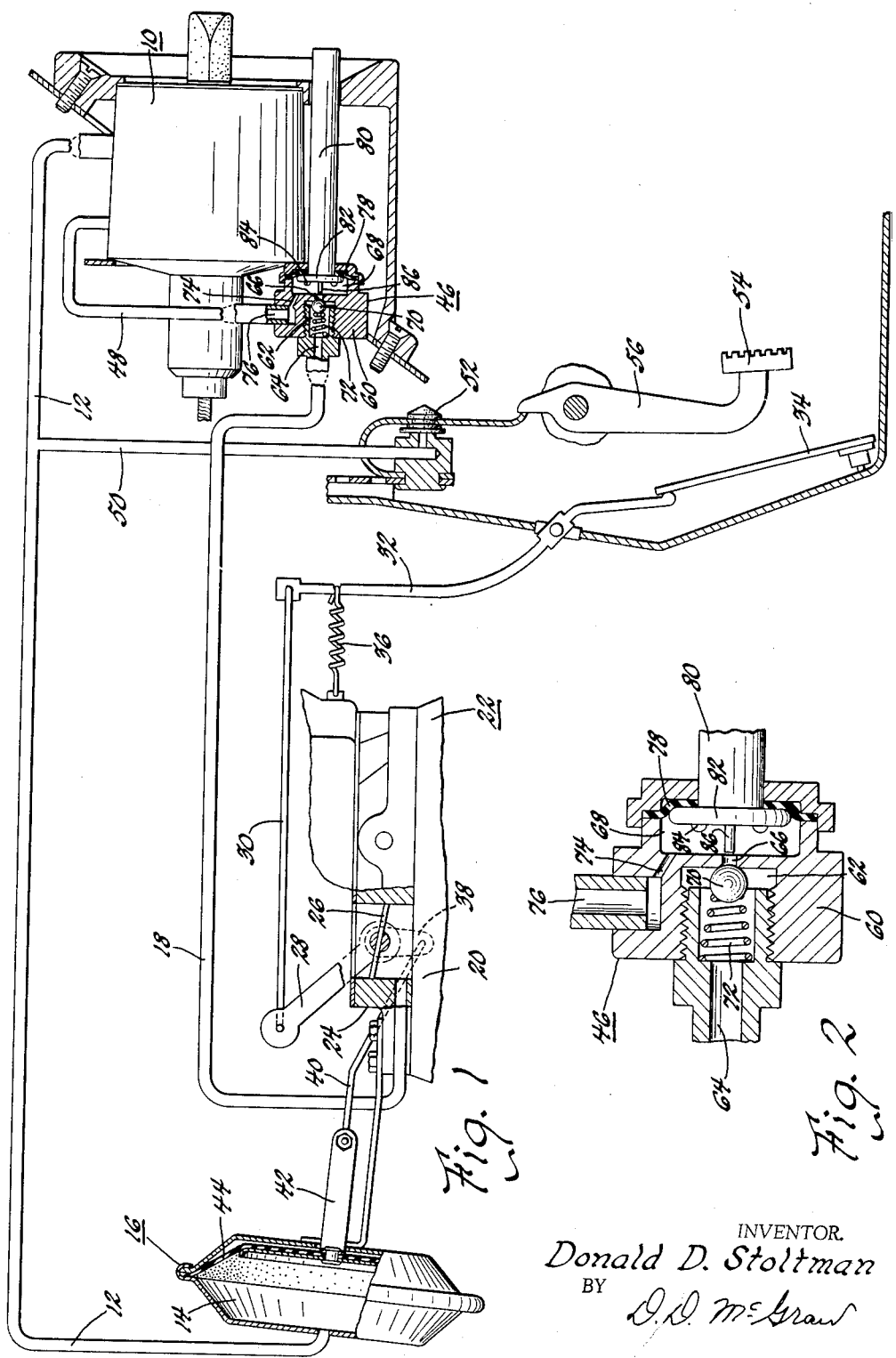
INVENTOR.
Donald D. Stoltman
BY
D.D. McGraw
HIS ATTORNEY United States Patent Office 3,120,874
Patented Feb. 11, 1964

3,120,874
VEHICLE ROAD SPEED CONTROL SYSTEM
Donald D. Stoltman, Henrietta, N.Y., assignor to General Motors Corporation, Detroit, Mich., a corporation of Delaware
Filed May 4, 1962, Ser. No. 192,581
1 Claim. (Cl. 180—82.1)

The invention relates to a system for controlling the road speed of vehicles and more particularly to a system wherein vehicle speed is sensed to provide a control pressure acting on a power servo to move the vehicle throttle to maintain the vehicle speed constant. It is desirable in such a system to have an operator controlled unit which must be actuated by the operator to condition the system for control of vehicle speed and to eliminate the possibility of accidental reengagement of the speed control system when it has been disengaged by the operator. To this end a speed control system is provided with a control valve located within a fluid pressure supply conduit connecting a source of fluid pressure and the power servo so that the valve effectively prevents the flow of fluid under pressure to the power servo until the vehicle operator has opened the valve. Once the valve is opened it is desirable to have it remain open so long as there is sufficient fluid pressure to actuate the servo, or until the vehicle operator otherwise disengages the system. This is accomplished by providing a normally closed check valve which is positively opened by action of the vehicle operator and is maintained in an open condition by fluid pressure in the fluid supply conduit. The fluid pressure maintains the valve open by acting on a power element which engages the check valve to hold the valve open. When the fluid pressure is insufficient to hold the power element against the check valve, the check valve is forceably closed, thereby cutting off supply of fluid pressure power to the servo.

In the drawings:

FIGURE 1 is a schematic presentation of a vehicle road speed control system installed on a vehicle engine and utilizing a control valve embodying the invention. Elements of the system are illustrated as being broken away and in section.

FIGURE 2 is an enlarged sectional view with parts broken away of the control valve of FIGURE 1.

The overall speed control system is substantially identical to the speed control system disclosed and described in copending application Serial No. 115,539, entitled Speed Control System, and filed June 7, 1961. Details of the overall system are to be found in that application and the disclosure of that application is therefore incorporated by reference as if fully reproduced herein.

The system includes a control head 10 which senses vehicle speed and establishes a control pressure in conduit 12 connected to the control chamber 14 of power servo 16. A fluid pressure supply conduit 18 is connected to the intake manifold 20 of engine 22. The carburetor 24 controls the fuel-air mixture entering engine 22 by movement of the throttle valve 26. Manual control of throttle valve 26 is obtained through the throttle links 28, 30 and 32, acceleraor pedal 34 and throttle return spring 36. A throttle link 38 is connected through a servo rod 40 and servo arm 42 to the movable wall 44 in servo 16. Raw intake manifold vacuum therefore exists in conduit 18 at all times. This conduit is connected to the control valve 46 and conduit 48 connects valve 46 to the control head 10. This furnishes the raw vacuum to the control head which is modified by the head in accordance with the desired vehicle speed and the actual vehicle speed as more particularly disclosed in the above identified application. A conduit 50 is connected with control pressure conduit 12 to a brake power actuated spoiler valve 52. Valve 52 is closed when the brake pedal 54 and its lever 56 are in the brake release position. Valve 52 is opened to permit air under atmospheric pressure to enter conduit 50 when the brake pedal is moved in the vehicle brake actuating direction. Atmospheric pressure then admitted to conduit 50 goes through conduit 12 to chamber 14 and the control head 10 is ineffective to control the servo 16.

Control valve 46 includes a housing 60 having a valve chamber 62 connected to passage 64 to conduit 18. An orifice 66 connects chamber 62 to another chamber 68 formed in housing 60. Ball check valve 70 is located in chamber 62 and urged to close orifice 66 by the spring 72. Chamber 68 is connected through orifice 74 to passage 76 which is in turn connected to conduit 48. A diaphragm 78 is provided to form a movable wall of chamber 68 and an elongated button 80 is attached to the diaphragm. Button 80 terminates in chamber 68 with an enlarged head 82 facing orifice 66. A group of spacers 84 are formed on this surface of head 82 so that the head cannot close orifice 66 at any time. A plunger 86 extends from the center of head 82 and is aligned with orifice 66 so that it can freely extend therethrough and engage ball check valve 70 when diaphragm 78 is moved toward orifice 66.

The control valve 46 is shown in position before the vehicle operator has actuated the system to control the road speed of the vehicle. Ball check valve 70 therefore seals orifice 66 and atmospheric pressure exists in chamber 68. In order to condition the system for vehicle speed control, he presses button 80, moving diaphragm 78 and button head 82 to the left together with plunger 86. The plunger engages and unseats ball check valve 70, thus admitting intake manifold vacuum to chamber 68. The reduced pressure is then admitted to chamber 68 and acts on diaphragm 78 and head 82 to hold the button in the inward, or left, position. Intake manifold vacuum is then impressed through orifice 74, passage 76 and conduit 48 to the control head 10. The control head generates a control pressure impressed through conduit 12 which is transmitted to chamber 14. This pressure is reduced from atmospheric pressure by modifying intake manifold vacuum in accordance with the desired set speed and the actual vehicle speed. The reduced pressure in chamber 14 causes diaphragm 44 of servo 16 to move to the left to hold throttle valve 26 open against the force of spring 36. This maintains the vehicle at a constant speed since the control pressure is modified with changes in vehicle speed to move the throttle valve 26 to increase and decrease the engine power in amounts necessary to maintain such a speed.

If the vehicle operator desires to temporarily disengage the speed control system, he opens spoiler valve 52 by actuation of the vehicle brakes through pedal 54 and lever 56. Intake manifold vacuum will retain button 80 in the left position, however, so that the supply of intake manifold pressure is not cut off. Thus the system may be returned to the speed control condition of operation without again requiring the operator to press button 80. If, however, the vehicle engine is stopped, there is no longer any intake manifold vacuum present in conduit 18 and chamber 68 to hold button 80 to the left. Spring 72 therefore acts through ball check valve 70 to close orifice 66 and move button 80 to the right by pushing the valve against plunger 86. Once check valve 70 closes orifice 66, the control system is cancelled until button 80 is again depressed.

The system has advantages in that automatic resumption of control is possible after vehicle braking within a speed range adjacent the set speed, as disclosed in the above identified application, but the speed control cannot be effective after the operator has first started the vehicle engine until he takes the positive step of depressing button 80. This eliminates the possibility of engaging the speed control system without the prior knowledge and consent of the vehicle operator. This is particularly important when persons may be driving the vehicle who are not familiar with the operation of such a control system.

I claim:

In a vehicle road speed control system having a fluid actuated throttle operating servo and means connected with said servo for controlling fluid pressure thereto to position the engine throttle to maintain constant vehicle speed and a source of reduced pressure connected with said control means and said servo, system activating and inactivating means comprising a housing having a reduced pressure outlet connected with said source of reduced pressure and a fluid pressure inlet connected with said servo and control means and a chamber formed in said housing, a movable wall in said chamber, check valve means in said reduced pressure outlet and permitting fluid flow from said chamber to said source of reduced pressure when open and preventing fluid flow therebetween when closed, means secured to said movable wall and including a plunger for externally caused movement of said chamber, said plunger having a reduced portion engageable with said check valve means when said movable wall is moved toward said check valve to hold said check valve open to permit reduced fluid pressure in said chamber and said inlet and said servo control means and said servo, said movable wall then being held in the check valve hold-open condition by the reduced pressure in said chamber, and means for closing said check valve and moving said plunger and said movable wall away from said check valve means.

References Cited in the file of this patent
UNITED STATES PATENTS

| | | |
|---|---|---|
| 1,946,882 | Russel | Feb. 13, 1934 |
| 2,671,542 | Robnett | Mar. 9, 1954 |
| 2,809,708 | Edwards | Oct. 15, 1957 |
| 2,962,044 | Charboneau | Nov. 29, 1960 |
| 2,990,825 | Fuller et al. | July 4, 1961 |